(12) United States Patent
Wilks

(10) Patent No.: US 11,977,011 B2
(45) Date of Patent: May 7, 2024

(54) ISOLATION AND ANALYSIS OF TERPENES

(71) Applicant: Dylan Elmer Wilks, New London, NH (US)

(72) Inventor: Dylan Elmer Wilks, New London, NH (US)

(73) Assignee: ORANGE PHOTONICS, INC., Elkins, NH (US)

( * ) Notice: Subject to any disclaimer, the term of this patent is extended or adjusted under 35 U.S.C. 154(b) by 0 days.

(21) Appl. No.: 17/832,113

(22) Filed: Jun. 3, 2022

(65) Prior Publication Data

US 2022/0291099 A1  Sep. 15, 2022

Related U.S. Application Data

(62) Division of application No. 16/415,338, filed on May 17, 2019, now Pat. No. 11,543,334.

(Continued)

(51) Int. Cl.
*G01N 1/40* (2006.01)
*B01D 15/32* (2006.01)
*B01J 20/20* (2006.01)
*B01J 20/283* (2006.01)
*B01J 20/285* (2006.01)

(Continued)

(52) U.S. Cl.
CPC ......... *G01N 1/4055* (2013.01); *B01D 15/325* (2013.01); *G01N 1/44* (2013.01); *G01N 30/14* (2013.01); *B01J 20/205* (2013.01); *B01J 20/283* (2013.01); *B01J 20/285* (2013.01); *B01J 20/292* (2013.01); *G01N 2001/4038* (2013.01); *G01N 2001/4061* (2013.01); *G01N 2001/4088* (2013.01); *G01N 2030/027* (2013.01); *G01N 2030/143* (2013.01)

(58) Field of Classification Search
CPC ........ G01N 1/405; G01N 1/4055; G01N 1/44; G01N 30/14; G01N 2001/4038; G01N 2001/4061; G01N 2001/4088; G01N 2030/027; B01D 15/265; B01D 15/325; B01L 3/5023; B01J 20/205; B01J 20/283; B01J 20/285; B01J 20/292

See application file for complete search history.

(56) References Cited

U.S. PATENT DOCUMENTS

| | | | | |
|---|---|---|---|---|
| 4,510,058 A | * | 4/1985 | Cais | ........................ G01N 30/58 |
| | | | | 210/657 |
| 4,517,094 A | * | 5/1985 | Beall | ..................... E02D 31/004 |
| | | | | 210/691 |

(Continued)

*Primary Examiner* — Paul M. West
(74) *Attorney, Agent, or Firm* — Morgan, Lewis & Bockius LLP

(57) ABSTRACT

In accordance with embodiments of the present invention, a terpene-rich sample is prepared for terpene analysis using liquid chromatography via an extraction method that takes little time, uses minimal external equipment, and permits direct injection of extracted terpenes into a liquid chromatography instrument for analysis. An embodiment of the invention involves preparing a terpene-containing sample for analysis by liquid chromatography by liquid extraction; heating the liquid extract in a vial that contains a filter medium or solvent; collecting the terpenes in the medium by the vapor pressure forced through the filter from heating; and eluting the collected terpenes into a vial or directly into a chromatography injector.

14 Claims, 2 Drawing Sheets

Related U.S. Application Data

(60) Provisional application No. 62/674,893, filed on May 22, 2018.

(51) Int. Cl.
| | | |
|---|---|---|
| *B01J 20/292* | (2006.01) | |
| *G01N 1/44* | (2006.01) | |
| *G01N 30/02* | (2006.01) | |
| *G01N 30/14* | (2006.01) | |

(56) References Cited

U.S. PATENT DOCUMENTS

| | | | | |
|---|---|---|---|---|
| 4,889,632 A | * | 12/1989 | Svec | B01D 71/76 |
| | | | | 210/500.36 |
| 2006/0219636 A1 | * | 10/2006 | Plumb | B01J 20/28019 |
| | | | | 210/656 |
| 2007/0292540 A1 | * | 12/2007 | Gow | A61P 25/02 |
| | | | | 568/717 |
| 2016/0297849 A1 | * | 10/2016 | Komoriya | A61P 13/02 |

* cited by examiner

ISOLATION AND ANALYSIS OF TERPENES

CROSS-REFERENCE TO RELATED APPLICATION

This application is a division of U.S. Ser. No. 16/415,338, filed on May 17, 2019, which claims priority to, and the benefit of, U.S. Provisional Patent Application No. 62/674,893, filed on May 22, 2018, the entirety of each of which is hereby incorporated by reference.

FIELD OF THE INVENTION

The field of the invention relates, generally, to the preparation and analysis of terpenes in natural products.

BACKGROUND

Terpenes are volatile hydrocarbons commonly found in the essential oils of plants. This class of chemicals is commonly used in food flavorings, perfumes and other scented products due to their strong and often pleasant odors. Terpenes are a major constituent of hop oil and can significantly affect beer flavor and quality. Similarly, Cannabis Sativa contains a wide variety of terpenes, and some research has shown that variations in terpene profile may affect medical outcomes.

Terpenes are all derived from the same chemical building block, isoprene, which is combined in various biochemical processes to create a broad array of molecules. For example, monoterpenes such as limonene (found in citrus fruits) and alpha-pinene (found in conifers) contain two isoprene units. Sesquiterpenes such as alpha-humulene and beta-caryophyllene (both commonly found in hops) contain three isoprene units.

Terpenes are commonly analyzed by gas chromatography. A gas chromatograph volatilizes a sample, which is then injected into a column and carried by an inert gas. The column is treated with specialized chemicals that have differing affinity to the injected sample. The column separates chemicals in the injected mixture so that they can be analyzed separately once they exit the column.

Sample preparation typically involves one of two methods. The most common method is called headspace gas chromatography. In this case, a small amount of a terpene-containing sample is placed in a vial and heated. The heating causes terpenes (and other volatile components) to volatilize, allowing the removal of heavier molecules that may interfere with analysis. Once the sample is volatilized, the vial cap is pierced by a needle and sample is removed for injection into a gas chromatograph.

In a second method, called solid-phase microextraction, a thread or wire that has been treated to exhibit affinity for terpenes is inserted into the vial. The vial is then agitated and/or heated to speed the collection of terpenes on the treated material. Once the terpenes have collected on the thread, the thread is heated or treated to remove the terpenes, which can be injected into a gas chromatograph.

Gas chromatography has some drawbacks when compared to another common analysis tool, liquid chromatography, that uses a process similar to gas chromatography but with the carrier gas replaced by an organic solvent, typically methanol or acetonitrile. Analysis of terpenes via liquid chromatography has several advantages:

1. Many organic compounds must be measured by liquid chromatography, so the equipment is already in widespread use.
2. Liquid chromatography generally has better repeatability when compared to gas chromatography.
3. Gas chromatography requires a volatilized sample for injection, thus heat is used. Terpenes may degrade or change when exposed to injection heat.
4. Liquid chromatography can be faster than gas chromatography.
5. Portable liquid chromatography devices exist, thus opening the possibility of field analysis.

Current techniques for measuring terpenes using liquid chromatography generally suffer from two disadvantages. First, there is often significant interference with other components in liquid-chromatography analysis of terpenes. Any non-volatile chemicals are necessarily included in a typical liquid chromatography analysis. Second, these techniques may use a liquid extraction technique that fails to provide adequate sensitivity for current liquid-chromatography detectors.

There is, accordingly, a need for techniques of preparing terpene-rich samples for liquid chromatography that provide both sensitivity and separation (or avoidance) of non-volatile chemicals from the terpenes to be measured.

SUMMARY

Embodiments of the present invention remove much of the complexity of sample preparation while still providing for efficient and repeatable collection of terpenes for sample analysis. In particular, terpenes are collected directly from a prepared sample by filter deposition, and may be conveniently introduced into a chromatography system.

Accordingly, in one aspect, the invention pertains to a method of analyzing terpenes in a sample. In various embodiments, the method comprises the steps of weighing and preparing the sample for extraction; adding, to a container, the sample and an extraction solvent; agitating the vial; heating the sample to force terpenes and the extraction solvent through a collection filter having therein a medium that preferentially binds terpenes; and eluting bound terpenes from the medium for analysis. The sample may, for example, be weighed in the container or in a component within the container. The eluted terpenes may be analyzed by liquid chromatography. For example, the terpenes may be eluted from the medium and injected into a chromatography instrument in a single step.

In various embodiments, airtight fluid communication is established between the medium and an inlet to the chromatography instrument. The medium may comprise, consist of, or consist essentially of a reverse-phase chromatography material, such as C8 or C18; activated carbon; activated silica; cellulose; polydimethylsiloxane; and/or an acrylate polymer. In other embodiments, medium comprises, consists of, or consists essentially of a liquid solvent, e.g., at least one of water, hexane, mineral oil, ethanol, methanol, isopropyl alcohol, acetonitrile, acetone, divinylbenzene, or polyethylene glycol.

The extraction solvent may be one or more of hexane, ethanol, methanol, isopropyl alcohol, acetonitrile, or acetone, and may be boiled until completely or partially volatilized. Alternatively, the extraction solvent may be heated below its boiling temperature but above a volatilization temperature of the terpenes in the sample. The analysis may occur following elution of the terpenes using a syringe or vacuum manifold.

In another aspect, the invention pertains to a vial assembly for collection and analysis of terpenes from a sample. In various embodiments, the vial assembly comprises a heat-resistant container portion open at one end thereof; and a cap for sealably covering the open end of the container portion. The cap comprises, in an interior portion thereof, a medium that preferentially binds to terpenes, and a connector for establishing fluid communication between the filter medium and an analytical instrument.

The medium may comprise, consist of, or consist essentially of a reverse-phase chromatography material, such as C8 or C18; activated carbon; activated silica; cellulose; polydimethylsiloxane; and/or an acrylate polymer. In other embodiments, medium comprises, consists of, or consists essentially of a liquid solvent, e.g., at least one of water, hexane, mineral oil, ethanol, methanol, isopropyl alcohol, acetonitrile, acetone, divinylbenzene, or polyethylene glycol.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The term "consists essentially of" means excluding other materials that contribute to function, unless otherwise defined herein. Nonetheless, such other materials may be present, collectively or individually, in trace amounts. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

In accordance with embodiments of the present invention, terpenes are first extracted from a sample into a solvent and entrained in a filter. The collected terpenes may then be eluted from the filter directly into a chromatography system or into a container for later analysis. More specifically, an embodiment of the invention involves preparing a terpene-containing sample for analysis by liquid chromatography by liquid extraction; heating the liquid extract in a vial that contains a specialized filter; collecting the terpenes in the filter medium by the vapor pressure forced through the filter from heating; and eluting the collected terpenes into a vial or directly into a chromatography injector.

Figure 1:
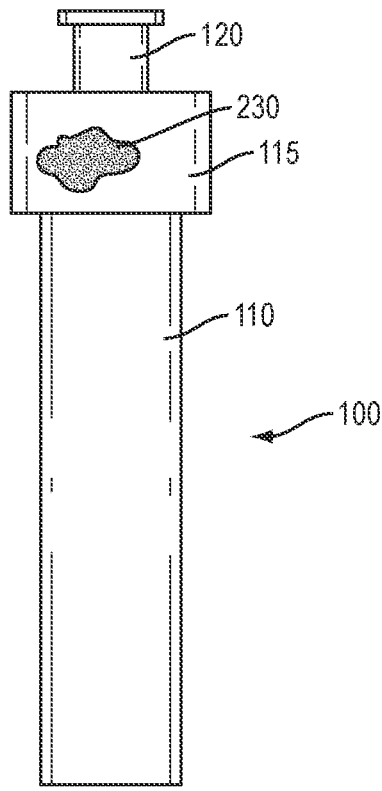
FIG. 1 is an elevational view of a sample vial in accordance with embodiments of the invention.
Figure 2:
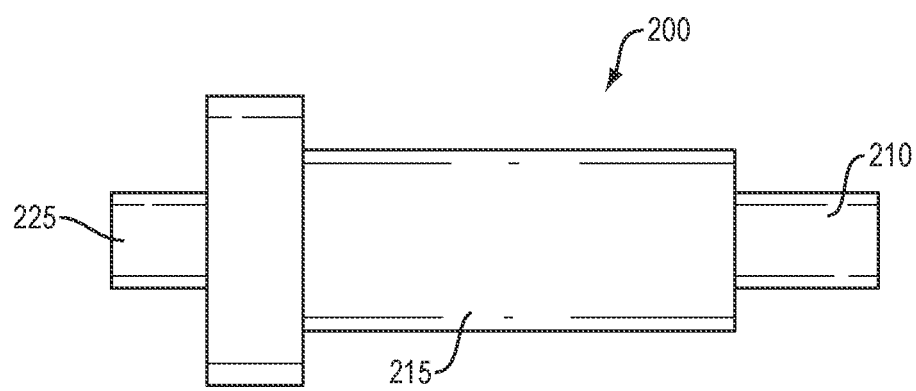
FIG. 2 is an elevational view of a filter cartridge in accordance with embodiments of the invention.

Refer to FIG. 1, which illustrates a collection vial 100 useful with embodiments of the present invention. The vial 100 includes a container portion 110 and a cap 115. The cap 115 is typically threaded and may have a luer or other connector 120 leading to a port through the top of the cap. The cap 115 replaces a conventional closed cap (not shown), but the closed cap is used during extraction as explained below. Depending on the sample size and type, the container portion 110 may have an interior volume ranging from, for example, 1 to 50 ml. The cap 115 (as well as the conventional cap) preferably provides an airtight seal (using threads and/or a rubber or TEFLON seal) with the interior of the container portion 110, and the connector 120 preferably provides an airtight seal with the filter unit 200, illustrated in FIG. 2—in particular, the connector 120 mates with a complementary connector 210 on the filter 200. In one embodiment, the filter unit 200 is a cartridge filter in which the cartridge 215 is filled with a suitable filter medium for entraining terpenes. The filter medium may be a reverse-phase chromatography material such as C8 or C18, or a general filter material such as activated carbon or cellulose, polydimethylsiloxane or other silicone, or an acrylate polymer. The filter unit 200 has an exhaust or outlet port 225 that may also facilitate connection to a syringe or other apparatus to allow elution of the collected terpenes.

In some embodiments, the filter medium is saturated or replaced entirely with a liquid solvent for which terpenes exhibit affinity. Suitable solvents include water, hexane, mineral oil, ethanol, methanol, isopropyl alcohol, acetonitrile, acetone, divinylbenzene, polyethylene glycol or combinations thereof. Particularly in the case where the liquid solvent fully replaces the filter medium, the cartridge 215 may contain a diffuser that allows small air bubbles to be generated in order to maximize interaction between the sample vapor and the liquid solvent. This diffuser may be porous TEFLON, paper, pumice, or simply a small opening in the entrance to the cartridge 215.

In another embodiment, the cap 115 contains the filter medium 230 (and/or solvent) as shown in the cutaway portion of FIG. 1, obviating the need for a separate filter unit 200. In this case, the connector 120 may have a removable sealing cap to retain an airtight interior of the container portion 110 during extraction.

Figure 3:
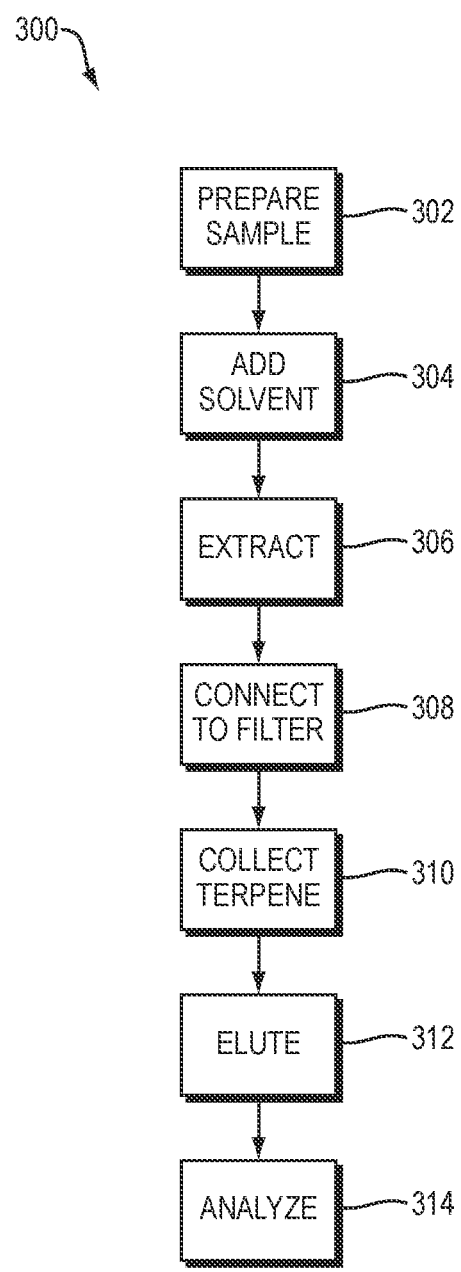
FIG. 3 is a flow chart illustrating a method in accordance with embodiments of the invention.

FIG. 3 is a flow chart of an exemplary approach 300 for isolating and analyzing terpenes using the collection vial 100 and the filter unit 200. In a first step 302, the sample is prepared by, for example, grinding in order to allow for efficient solvent extraction of terpenes from the sample. A specific amount of sample, typically 100-5000 mg, is weighed. For example, the sample may be weighed either in the sample vial 100 used for analysis, the cap 115 of the vial 100, or a small weigh boat that can be placed inside the extraction vial 100. This avoids any loss of material that might affect subsequent analysis. An analytical balance or scale capable of weighing samples with at least 1 mg accuracy may be employed. The final weight is noted and adjusted to eliminate any deviation from the target weight. If not weighed in the disposable extraction vial 100, which typically has a container volume of 1-50 ml, the prepared sample is added thereto.

Next, an appropriate extraction solvent—typically 1-30 ml—is added to the vial 100. The solvent may depend on the nature of the sample and the terpene to be collected, and embodiment. The solvent must be compatible with the chromatography system used for subsequent analysis. Example solvents are hexane, ethanol, methanol, isopropyl alcohol, acetonitrile and acetone, as well as mixtures thereof. Proper safety equipment and ventilation may be required depending on the particular solvent used.

In step 306, the sample is extracted using an appropriate method for the sample type, such as mechanical shaking or ultrasonic agitation. In one embodiment, with the conventional cap in place, the vial 100 is placed in a small hobby paint or nail polish shaker for extraction. In other embodiments, a mechanical wrist shaker or ultrasonic bath is employed. After extraction, the terpenes will be dissolved in the extraction solvent, typically along with other non-volatile components which may interfere with the analysis. In step 308, the conventional cap is replaced with the cap 115, and the latter is connected to the filter 200 as described above. In still another embodiment, the filter medium 230 is disposed within the cap 115 as a plug or disk, obviating the need for a separate filter unit 200.

In step 310, the vial 100 is heated using a boiling water heater, a hot plate, or a burner. In one embodiment, the vial 100 is warmed above the boiling temperature of the extraction solvent so that the solvent and terpenes are both vaporized. The change in vapor pressure forces headspace air in the vial 100 through the connected filter 200. The headspace air will contain volatilized terpenes and extraction solvent. The filter medium in the cartridge 215 preferentially bind to terpenes, so the solvent will pass through while the terpenes will be trapped by the filter medium. In at least one embodiment, the sample and solvent are boiled until the extraction solvent is completely vaporized. In another embodiment, the solvent is boiled for a prescribed amount of time. In yet another embodiment, the solvent is kept below boiling temperature but hot enough that some vapor pressure causes terpenes to be collected on the filter medium.

After the terpenes are collected on the filter medium, in step 312 an elution solvent is passed through the filter cartridge 215 (e.g., using a syringe or vacuum manifold) and collected in a vial for subsequent liquid chromatography analysis (step 314). Alternatively, the filter cartridge 215 may be connected directly to a syringe on one end (i.e., the connector 210 or the port 225) and a liquid-chromatography sample injector on the other end. A prescribed amount of elution solvent is injected, drawing the terpenes off the filter medium and into either a chromatography sample loop or directly into a chromatography system, thus allowing elution of terpenes and injection into an instrument in a single step. Following use, the filter medium may be cleaned with an appropriate solvent or discarded.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A vial assembly for collection and analysis of terpenes from a sample, the vial assembly comprising:
   a. a heat-resistant container portion configured to contain the sample therewithin, the container portion being open at one end thereof; and
   b. a cap comprising, in an interior portion thereof, a medium that binds to volatilized terpenes, and a connector for establishing fluid communication between the medium and an analytical instrument,
   wherein the cap is configured to sealably cover and fasten to the open end of the container portion to thereby fixedly suspend the medium over the container portion and the sample therewithin.

2. The vial assembly of claim 1, wherein the medium is a reverse-phase chromatography material.

3. The vial assembly of claim 2, wherein the medium is C8 or C18.

4. The vial assembly of claim 1, wherein the medium is activated carbon.

5. The vial assembly of claim 1, wherein the medium is activated silica.

6. The vial assembly of claim 1, wherein the medium is cellulose.

7. The vial assembly of claim 1, wherein the medium is polydimethylsiloxane.

8. The vial assembly of claim 1, wherein the medium is an acrylate polymer.

9. The vial assembly of claim 1, wherein the medium is a liquid solvent.

10. The vial assembly of claim 1, wherein the medium is at least one of water, hexane, mineral oil, ethanol, methanol, isopropyl alcohol, acetonitrile, acetone, divinylbenzene, or polyethylene glycol.

11. The vial assembly of claim 1, further comprising a removable second cap for sealably covering the connector.

12. The vial assembly of claim 1, further comprising a weigh boat configured to receive the sample and configured for placement within the container portion.

13. The vial assembly of claim 1, wherein the cap is threaded to sealably cover and fasten to the open end of the container portion.

14. The vial assembly of claim 1, further comprising a heater configured to heat the container portion and thereby cause volatilization of terpenes in the sample.

* * * * *